(12) United States Patent
Cheshire et al.

(10) Patent No.: US 7,436,783 B2
(45) Date of Patent: Oct. 14, 2008

(54) METHOD AND APPARATUS FOR DETECTING A ROUTER THAT IMPROPERLY RESPONDS TO ARP REQUESTS

(75) Inventors: Stuart D. Cheshire, San Jose, CA (US); Joshua V. Graessley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 502 days.

(21) Appl. No.: 11/098,135

(22) Filed: Apr. 4, 2005

(65) Prior Publication Data

US 2006/0221979 A1    Oct. 5, 2006

(51) Int. Cl.
H04L 12/28    (2006.01)
H04L 12/66    (2006.01)

(52) U.S. Cl. .................. 370/254; 370/352; 370/389; 370/395.54

(58) Field of Classification Search ............ 370/395.54, 370/352, 256, 252, 475, 328, 254, 389, 401, 370/242
See application file for complete search history.

(56) References Cited

U.S. PATENT DOCUMENTS

| 5,708,654 | A | 1/1998 | Arndt et al. ................. 370/242 |
| 5,724,510 | A | 3/1998 | Arndt et al. ................ 395/200.5 |
| 7,200,649 | B1* | 4/2007 | Batke et al. ..................... 709/222 |
| 2003/0167405 | A1* | 9/2003 | Freund et al. ................. 713/201 |
| 2004/0039847 | A1* | 2/2004 | Persson et al. ............... 709/250 |
| 2004/0095897 | A1* | 5/2004 | Vafaei ......................... 370/254 |
| 2004/0109457 | A1* | 6/2004 | Johnson et al. ............. 370/401 |
| 2005/0174961 | A1* | 8/2005 | Hrastar ........................ 370/328 |
| 2006/0224704 | A1* | 10/2006 | Parikh et al. ................. 709/220 |

OTHER PUBLICATIONS

"Dynamic Configuration of IPv4 Link-Local Addresses", by Stuart Cheshire et al., The Internet Society 2004, Jul. 8, 2004, Zeroconf Working Group, Internet-Draft, <draft-ietf-zeroconf-ipv4-linklocal-17.txt>.

* cited by examiner

Primary Examiner—Hassan Kizou
Assistant Examiner—Brandon Renner
(74) Attorney, Agent, or Firm—Park, Vaughan & Fleming LLP

(57) ABSTRACT

One embodiment of the present invention provides a system that detects a non-compliant router that incorrectly responds to all address-resolution-protocol (ARP) requests, including ARP requests for link-local IP addresses. This is accomplished by sending an ARP request asking for an Ethernet address associated with a link-local IP address, wherein the link-local IP address is a reserved link-local IP address, which should not be assigned to any device. If a response is received to the ARP request, the system determines that the response was sent by a non-compliant router that incorrectly responds to all ARP requests, including ARP requests for link-local IP addresses.

15 Claims, 4 Drawing Sheets

METHOD AND APPARATUS FOR DETECTING A ROUTER THAT IMPROPERLY RESPONDS TO ARP REQUESTS

BACKGROUND

1. Field of the Invention

The present invention relates to computer networks. More specifically, the present invention relates to a method and an apparatus for detecting a non-compliant router that improperly responds to ARP requests for IPv4 Link-Local addresses.

2. Related Art

In order to participate in an Internet Protocol (IP) network, a network node, such as a computer or a printer, needs to be configured with an IP address. Additionally, in order communicate with another device using IP over Ethernet or similar media, the network node needs the ability to translate an IP address for the device into the corresponding hardware (e.g. Ethernet) address for the device. The Address Resolution Protocol (ARP) solves this translation problem by providing an address-resolution mechanism which determines the hardware address for a given IP address, thereby enabling a network node to participate in an IP network.

IP addresses can be configured either manually by the user, or automatically with the help of another network node, such as a DHCP server. Unfortunately, a DHCP server may not always be available. Furthermore, it is cumbersome to have the user configure an IP address. Therefore, there is a strong need for a configuration mechanism by which a network node can automatically configure an IP address on its own.

IPv4 Link-local addressing (RFC 3927) provides such a configuration mechanism. In IPv4 link-local addressing, a configuration mechanism within a network node randomly picks a "candidate" IP address in a specified link-local address range and sends an ARP request to check whether the candidate link-local IP address is unique within the scope of the link. If the candidate link-local IP address is already in use by another network node, then the configuration mechanism picks another link-local IP address and checks whether that is unique. Once the configuration mechanism finds a unique link-local IP address, the network node uses it to communicate with other nodes in the network.

Unfortunately, some network routers are misconfigured to respond to all ARP requests, including ARP requests for any link-local IP address. If such a router is attached to a local network, it can interfere with the configuration mechanism by responding to ARP requests sent by the configuration mechanism, making it appear as if every single possible address is already in use. This can prevent the configuration mechanism from selecting an IP address.

For example, FIG. 1 illustrates how a router can interfere with the process of assigning an IP address. During operation, node A selects a candidate IP address (step 102). Next, node A probes for the candidate IP address by performing an ARP request (step 104). The interfering router then responds to the ARP request (step 106). This causes node A to infer that another node already has the IP address, and to select a different candidate IP address (step 108). The system then returns to step 104 and the process repeats indefinitely. Consequently, node A is unable to assign an IP address.

Note that if such a router is configured to ignore ARP "probes," which are sent by a device that is attempting to assign a link-local IP address, the router can still interfere with normal (non-probe) ARP requests, which are sent to determine an Ethernet address associated with an IP address.

For example, FIG. 2 illustrates how a router can interfere with normal ARP requests. First, a node A sends an ARP request with the IP address of a device that node A wants to communicate with (step 202). Next, a router incorrectly responds to the ARP request, interfering with the response from the actual device that node A wants to communicate with (step 204). This causes node A to obtain the wrong Ethernet address. IP packets are subsequently sent to the router instead of to the desired device, where they are lost because the router either forwards them incorrectly, or simply discards them without forwarding at all.

Hence, what is needed is a method and an apparatus for handling the above-described problems encountered while performing ARP requests.

SUMMARY

One embodiment of the present invention provides a system that detects a non-compliant router that incorrectly responds to all address-resolution-protocol (ARP) requests, including ARP requests for link-local IP addresses. A router is permitted to respond to ARP requests for a single IPv4 Link-Local address that it has properly claimed for its own legitimate use (for example, under the protocol specified in Network Working Group RFC 2937), but it is not correct for it to answer indiscriminately ARP requests for every IPv4 Link-Local address. Detecting a non-compliant router is accomplished by sending an ARP request asking for an Ethernet address associated with a link-local IP address, wherein the link-local IP address is a reserved link-local IP address, which should not be assigned to any device. If a response is received to the ARP request, the system determines that the response was sent by a non-compliant router that incorrectly responds to all ARP requests, including ARP requests for link-local IP addresses.

In a variation on this embodiment, the reserved link-local IP address is the broadcast address 169.254.255.255 and/or 169.254.0.0.

In a variation on this embodiment, if it is determined that the response is from a non-compliant router, the system places the source address for the non-compliant router on a black list pertaining to the specific IP address range in question (e.g. 169.254/16). The system then ignores subsequent ARP responses pertaining to that address range when they come from source addresses in the black list, so that subsequent incorrect ARP responses from the non-compliant router will be ignored.

In a variation on this embodiment, the ARP request is an ARP probe, which is sent by a requesting device that is in the process of assigning itself a link-local IP address.

In a further variation, prior to sending the ARP request, the requesting device selects a candidate link-local IP address, and sends an initial ARP probe for the candidate link-local IP address. Only if a response is received to the initial ARP probe does the requesting device send the ARP probe (with the reserved link-local IP address) to determine if a non-compliant router may have responded to the initial ARP probe.

In a variation on this embodiment, if the ARP probe with the reserved link-local IP address is not responded to, the requesting device assigns the candidate link-local IP address.

In a variation on this embodiment, the ARP request is a normal ARP request (not an ARP probe). If no response is received to the ARP request, or if a response is received from a non-compliant router and the source address for the non-compliant router is placed on a black list, the system then sends a subsequent ARP request for a valid link-local IP address to determine an Ethernet address associated with the valid link-local IP address.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Networked Computer System

Figure 1:
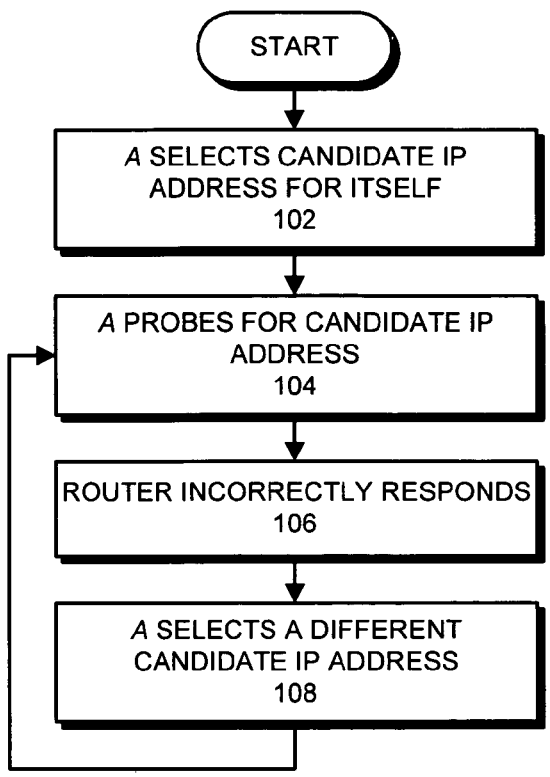
FIG. 1 presents a flow chart illustrating how a router can interfere with the process of assigning an IP address.
Figure 2:
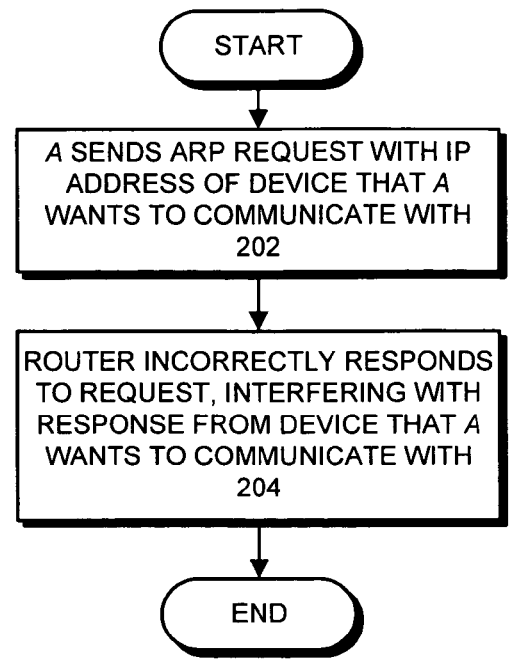
FIG. 2 presents a flow chart illustrating how a router can interfere with a normal ARP request.
Figure 3:
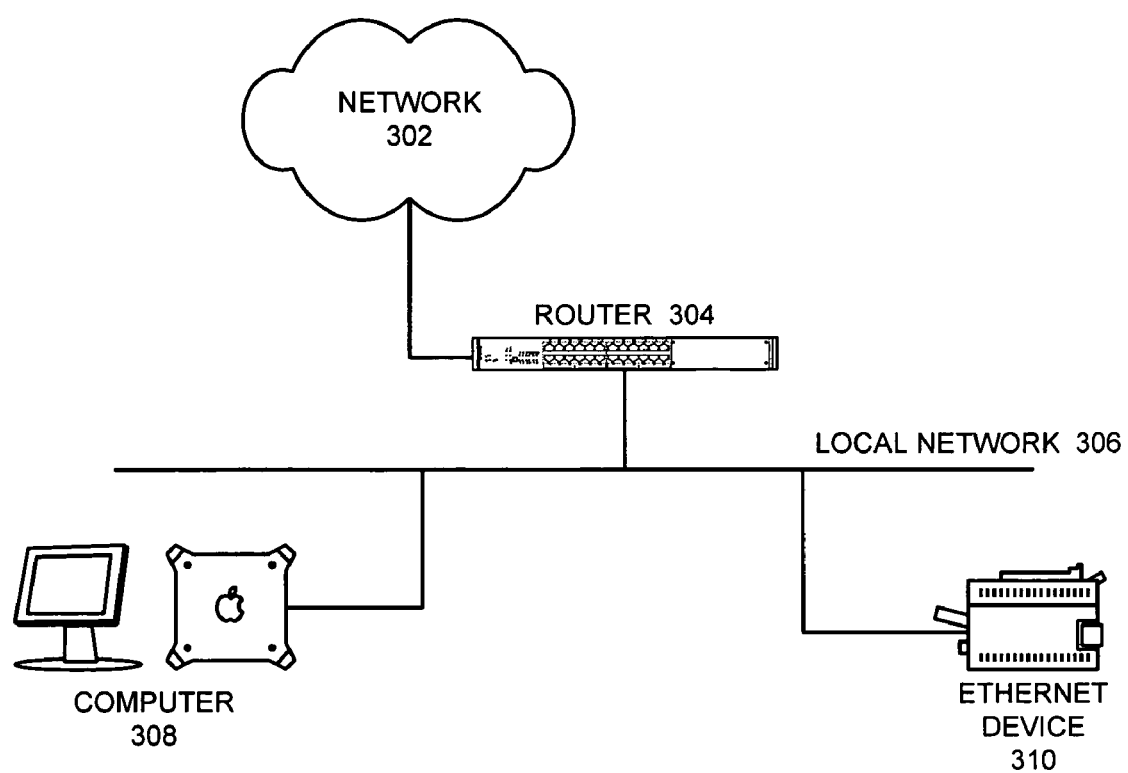
FIG. 3 illustrates a networked computer system in accordance with an embodiment of the present invention.

FIG. 3 illustrates a networked computer system 300 in accordance with an embodiment of the present invention. Networked computer system 300 includes a local network 306, which couples together a computer 308, a router 304 and an Ethernet device 310. Local network 306 can include any type of computer network, such as an Ethernet. Computer 308 can include any type of network device which can perform an ARP request. Ethernet device 310 can include any type of device (such as a printer) that a node (such as computer 308) wants to communicate with.

Router 304 is a device that couples local network 306 to a network 302, such as the Internet. However, in this system, router 304 is a "non-compliant" router that can potentially interfere with ARP requests performed by computer 308. For example, router 304 can interfere with ARP probes performed during the process assigning a link-local IP address, or with ARP requests performed to identify an Ethernet address associated with an IP address, such as an IP address for Ethernet device 310.

This interference can be handled as is described below with reference to FIGS. 4 and 5.

Process of Assigning an IP Address

Figure 4:
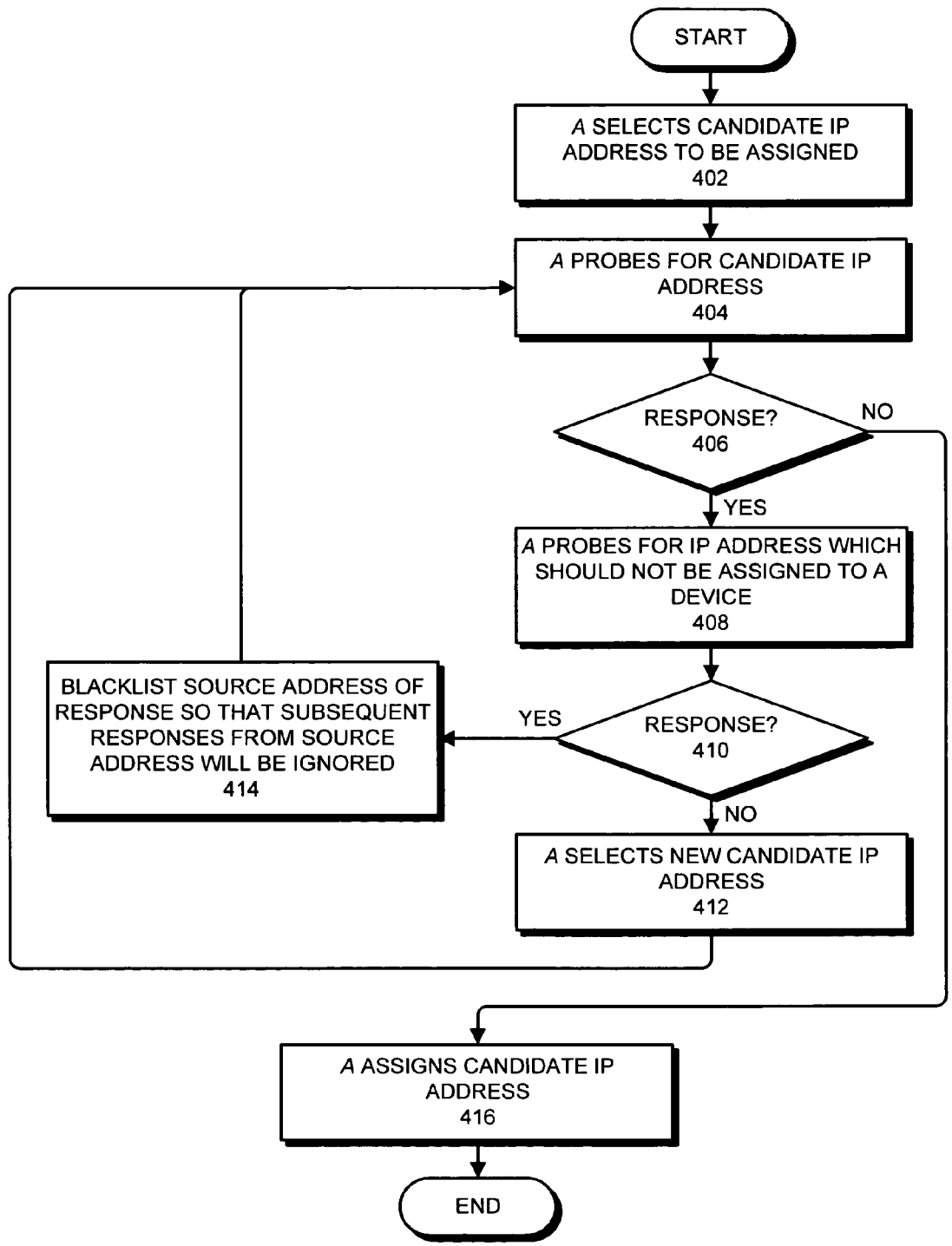
FIG. 4 presents a flow chart illustrating the process of assigning an IP address in accordance with an embodiment of the present invention.

FIG. 4 presents a flow chart illustrating the process of assigning an IP address in accordance with an embodiment of the present invention. The process starts when a node A selects a candidate IP address to be assigned (step 402). Next, node A performs an initial ARP probe for the candidate IP address (step 404) and waits for a response (step 406).

If there is no response to the initial ARP probe, the candidate IP address is not assigned to any device. In this case, the system assigns the candidate IP address, typically to one of its interfaces (step 416). At this point, the process of assigning the IP address is complete.

If there is a response, the node A performs a second ARP probe for a reserved link-local IP address, which should not be assigned to any device, such as the broadcast address 169.254.255.255 and/or 169.254.0.0 (step 408). If there is no response to this second ARP probe, the system infers that no router is responding to ARP requests for link-local IP addresses. Hence, the response to the initial ARP probe validly indicates that the candidate IP address is already assigned to another device. In this case, the system selects a new candidate IP address (step 412) and returns to step 404 to probe for the new candidate IP address.

On the other hand, if there was a response to the second ARP probe in step 410, the system infers that a router is incorrectly responding to link-local IP addresses. In this case, the system blacklists the source address of the response so that subsequent responses from the source address will be ignored (step 416). The system then returns to step 404 to probe for the candidate address again.

Note that an ARP probe (which is used to test a candidate IP address) can be differentiated for a normal ARP request because the source address of an ARP probe is all zeros. Hence, it is possible that a router might be correctly configured to not respond to ARP probes, yet still incorrectly respond to normal ARP requests. In this case, the router will not interfere with ARP probes during the process of assigning IP addresses, but may instead interfere with normal ARP requests, in which a node seeks to determine an Ethernet address associated with a valid link-local IP address. This problem can be handled by the process described below with reference to FIG. 5.

Process of Performing an ARP Request

Figure 5:
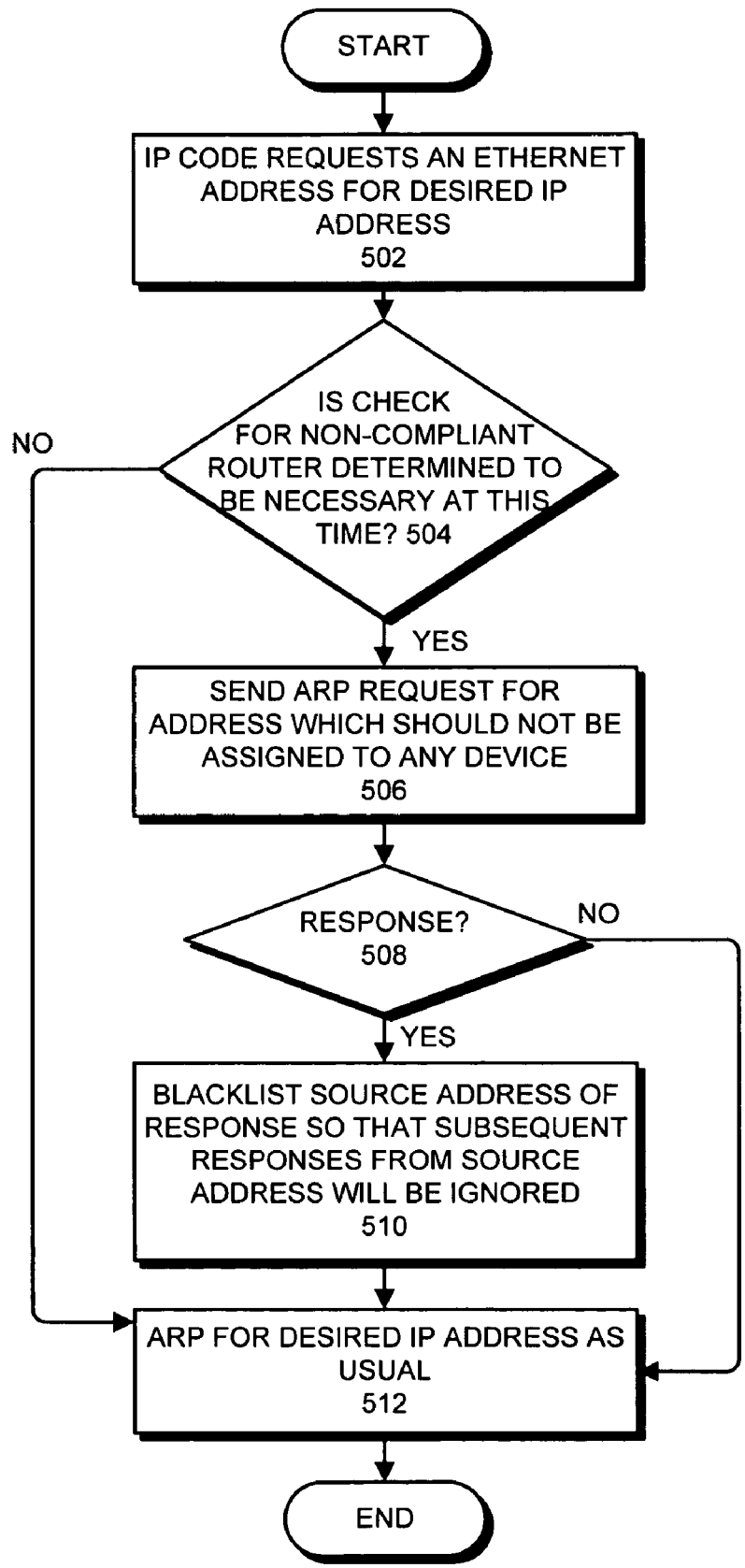
FIG. 5 presents a flow chart illustrating the process of performing an ARP request in accordance with an embodiment of the present invention.

FIG. 5 presents a flow chart illustrating the process of performing an ARP request in accordance with an embodiment of the present invention. The process starts when IP code in a node A requests an Ethernet address for a desired IP address (step 502). Next, the system determines if (a) this will be the first link-local ARP on this interface to the network since the interface was enabled, or (b) it has been more than some time period since the system last checked for a non-compliant router on this link (step 504). If not, the system ARPs for the address as usual to determine the Ethernet address for the desired IP address (step 512).

On the other hand, if at step 504 the system determines that this will be the first link-local ARP on the interface, or that it is time to re-check this interface, the system first tests to see if there is a router indiscriminately responding to ARP requests on the network associated with the interface. This involves sending an initial ARP request on the network, for an address which should not be assigned to any node (as is described above) (step 506). The system then waits for a response (step 508). If there is no response, the system infers that no router is indiscriminately responding to the link-local ARP requests on the network. In this case, the system ARPs for the desired IP address as usual (step 512).

On the other hand, if there is a response to the ARP request, the system infers that a router is indiscriminately responding to link-local IP addresses. In this case, the system blacklists the source address of the response so that subsequent responses from that source address will be ignored (step 510) when they pertain to link-local IP addresses. The system then proceeds to step 512 and ARPs for the desired IP address as usual.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting a device that incorrectly responds to address-resolution-protocol (ARP) requests, comprising:
   sending an ARP probe for a link-local address;
   when a response is received to the ARP probe, sending an ARP request to the responding device asking for an Ethernet address associated with a reserved IP address, wherein the reserved IP address is an Ipv4 link-local broadcast address 169.254.255.255 or an IPv4 link-local address 169.254.0.0, which should not be assigned to any device; and
   if a response is received from the device to the ARP request, placing the address of the device on a black list associated with a range of link-local IP addresses: and
   ignoring subsequent ARP responses from source addresses in the black list for the link-local address range, so that subsequent ARP responses pertaining to that address range from the device will be ignored.

2. The method of claim 1, wherein the ARP probe is sent by a requesting device that is in the process of assigning a candidate link-local IP address.

3. The method of claim 2, wherein when no response is received to the ARP request with the reserved link-local IP address, the requesting device assigns the candidate link-local IP address.

4. The method of claim 1, wherein the ARP request is a normal ARP request (not an ARP probe); and
   wherein if no response is received to the ARP request, or if a response is received from a device and the source address for the device is placed on a black list, the method further comprises sending a subsequent ARP request for a valid link-local IP address to determine an Ethernet address associated with the valid link-local IP address.

5. A computer-readable storage medium storing instructions that when executed by a computer cause the computer to perform a method for detecting a device that incorrectly responds to address-resolution-protocol (ARP) requests, the method comprising:
   sending an ARP probe for a link-local address;
   when a response is received to the ARP probe, sending an ARP request to the responding device asking for an Ethernet address associated with a reserved IP address, wherein the reserved IP address is an IPv4 link-local broadcast address 169.254.255.255 or an IPv4 link-local address 169.254.0.0 , which should not be assigned to any device; and
   if a response is received from the device to the ARP request, placing the address of the device on a black list associated with a range of link-local IP addresses; and
   ignoring subsequent ARP responses from source addresses in the black list for the link-local address range, so that subsequent ARP responses pertaining to that address range from the device will be ignored.

6. The computer-readable storage medium of claim 5, wherein the ARP probe is sent by a requesting device that is in the process of assigning a candidate link-local IP address.

7. The computer-readable storage medium of claim 6, wherein when no response is received to the ARP request with the reserved link-local IP address, the requesting device assigns the candidate link-local IP address.

8. The computer-readable storage medium of claim 5, wherein the ARP request is a normal ARP request (not an ARP probe); and
   wherein if no response is received to the ARP request, or if a response is received from a device and the source address for the device is placed on a black list, the method further comprises sending a subsequent ARP request for a valid link-local IP address to determine an Ethernet address associated with the valid link-local IP address.

9. An apparatus that detects a device that incorrectly responds to address-resolution-protocol (ARP) requests, comprising:
   a sending mechanism configured to sending an ARP probe for a link-local address;
   wherein, when a response is received to the ARP probe, the sending mechanism is configured to send an ARP request asking for an Ethernet address associated with a reserved IP address, wherein the reserved IP address is an IPv4 link-local broadcast address 169.254.255.255 or an Ipv4 link-local address 169.254.0.0, which should not be assigned to any device; and
   a black-listens mechanism, wherein if a response is received from the device, the black-listing mechanism is configured to:
   place the address of the device on a black list associated with a range of link-local IP addresses: and to
   ignore subsequent ARP responses from the source addresses in the black list for the link-local address range, so that subsequent ARP responses pertaining to the address range from the device will be ignored.

10. The apparatus of claim 9, wherein the ARP probe is sent by a requesting device that is in the process of assigning a link-local IP address.

11. The apparatus of claim 10, further comprising an assigning mechanism, wherein when no response is received to the ARP request with the reserved link-local IP address, the assigning mechanism is configured to assign the candidate link-local IP address.

12. The apparatus of claim 9 wherein the ARP request is a normal ARP request (not an ARP probe); and
   wherein if no response is received to the ARP request, or if a response is received from a device and the source address for the device is placed on a black list, the sending mechanism is configured to send a subsequent ARP request for a valid link-local IP address to determine an Ethernet address associated with the valid link-local IP address.

13. A method for detecting a device that improperly responds to multicast and/or broadcast requests, comprising:
   transmitting a first multicast or broadcast request to a plurality of recipients, wherein, when a response is received to the first request, transmitting a second multicast or broadcast request to the plurality of recipients, wherein the request is structured so that the request should not be responded to; and if a response is received to the second request, from a device, piecing the address of the device on a black list; and ignoring subsequent responses from the source addresses in the black list, so that subsequent responses from the device will be ignored.

14. The method of claim 13, wherein the request is an ARP request.

15. A method for detecting a device that improperly responds to requests, comprising:

transmitting a first request to a plurality of recipients, wherein, when a response is received to the first request, transmitting a second request, wherein the second request is structured so that the request should not be responded to; and if a device responds to the second request, placing the address of the device on a black list and:

ignoring subsequent responses from source addresses in the black list, so that subsequent responses from the device will be ignored.

* * * * *

UNITED STATES PATENT AND TRADEMARK OFFICE
CERTIFICATE OF CORRECTION

| | | |
|---|---|---|
| PATENT NO. | : 7,436,783 B2 | Page 1 of 1 |
| APPLICATION NO. | : 11/098135 | |
| DATED | : October 14, 2008 | |
| INVENTOR(S) | : Stuart D. Cheshire et al. | |

It is certified that error appears in the above-identified patent and that said Letters Patent is hereby corrected as shown below:

In claim 9 (at column 6, line 34), please change the words "black-listens" to the words --black-listing--.
      In claim 13 (at column 7, line 2), please change the word "piecing" to the word --placing--.

Signed and Sealed this

Seventeenth Day of February, 2009

JOHN DOLL
*Acting Director of the United States Patent and Trademark Office*